United States Patent
Chieze et al.

(10) Patent No.: US 8,831,219 B2
(45) Date of Patent: Sep. 9, 2014

(54) METHOD OF TRANSMITTING AN ADDITIONAL PIECE OF DATA TO A RECEPTION TERMINAL

(75) Inventors: Quentin Chieze, Paris (FR); Louis Neau, Chateaugiron (FR); Bruno Tronel, Courbevoie (FR)

(73) Assignee: Les Collines de l'Arche-Tour Opera (FR)

( * ) Notice: Subject to any disclaimer, the term of this patent is extended or adjusted under 35 U.S.C. 154(b) by 1156 days.

(21) Appl. No.: 12/310,384

(22) PCT Filed: Aug. 21, 2007

(86) PCT No.: PCT/EP2007/058689
§ 371 (c)(1),
(2), (4) Date: Feb. 20, 2009

(87) PCT Pub. No.: WO2008/023023
PCT Pub. Date: Feb. 28, 2008

(65) Prior Publication Data
US 2009/0323949 A1    Dec. 31, 2009

(30) Foreign Application Priority Data
Aug. 23, 2006 (FR) .................................. 06 53433

(51) Int. Cl.
H04N 7/167       (2011.01)
H04N 21/4367     (2011.01)
H04N 21/6336     (2011.01)

(52) U.S. Cl.
USPC ............ 380/239; 380/201; 380/210; 380/240

(58) Field of Classification Search
CPC ............ H04N 7/1675; H04N 21/2541; H04N 21/4627; H04N 21/26613; H04N 21/4405; H04N 21/26606; H04N 21/44236

USPC ................ 380/264, 202, 238–242, 201, 210; 725/31
See application file for complete search history.

(56) References Cited

U.S. PATENT DOCUMENTS 6,157,719 A * 12/2000 Wasilewski et al. .......... 380/210
6,286,103 B1 * 9/2001 Maillard et al. ................ 726/26
6,697,489 B1 * 2/2004 Candelore ..................... 380/200

(Continued)

FOREIGN PATENT DOCUMENTS

EP    1 703 731 A1    9/2006
FR    2 866 772       8/2005

(Continued)

OTHER PUBLICATIONS

IEEE Std. 1364(E):2001, Behavioral Languages—Part 4: Verilog Hardware Description Language, 2004.*

*Primary Examiner* — Linglan Edwards
*Assistant Examiner* — Forrest Carey
(74) *Attorney, Agent, or Firm* — Baker Hostetler LLP

(57) ABSTRACT

The invention relates to a method of transmitting at least one additional piece of data D in a list of access control words $CW_i$ to a scrambled content transmitted by a content server of an operator to a user equipment (2) including a reception terminal (4) associated with a security processor (6), each control word $CW_i$ of said list being designed to descramble said contents during a determined cryptoperiod, this method includes the following steps:
  a) prior replacement of at least one of the control words of said list with a magnitude X resulting from the treatment of said additional piece of data D by a function G having a dual function H,
  and, at the reception of said list by the 15 reception terminal (4),
  b) retrieve said additional piece of data D by treating said magnitude X with dual function H.

13 Claims, 2 Drawing Sheets

(56) References Cited

U.S. PATENT DOCUMENTS

| | | | |
|---|---|---|---|
| 2002/0126847 A1* | 9/2002 | Wajs et al. | 380/255 |
| 2002/0194492 A1* | 12/2002 | Choi et al. | 713/200 |
| 2005/0216955 A1* | 9/2005 | Wilkins et al. | 726/23 |
| 2005/0238170 A1* | 10/2005 | Ksontini et al. | 380/268 |

FOREIGN PATENT DOCUMENTS

| | | |
|---|---|---|
| FR | 2 866 773 | 8/2005 |
| FR | 2 876 858 | 4/2006 |
| FR | 2 882 208 | 8/2006 |
| WO | WO 02/13529 A1 | 2/2002 |

* cited by examiner

METHOD OF TRANSMITTING AN ADDITIONAL PIECE OF DATA TO A RECEPTION TERMINAL

TECHNICAL FIELD

The invention is positioned in the field of access control to multimedia services, and more specifically relates to a method of transmitting at least one piece of additional data D in a list of access control words CWi to scrambled content transmitted by a content server of an operator to a user equipment including a reception terminal associated with a security processor, with each control word CWi of said list designed to descramble said content during a determined cryptoperiod.

This invention also relates to a security processor and a reception terminal operating in a user equipment designed to receive said contents with a list of control words CWi wherein is transmitted an additional piece of data D.

The invention further relates to a content server designed to transmit to a user equipment a scrambled content to which is associated a list of control words CWi each designed to descramble said contents during a determined cryptoperiod, list wherein is transmitted an additional piece of data D.

The invention also relates to a reception terminal designed to receive a scrambled content transmitted by a server, said content being accompanied by a list of control words CWi, each control word being designed to descramble said contents during a determined cryptoperiod wherein said list at least one of the control words has been replaced with a magnitude X resulting from the treatment of an additional piece of data D by a function G having a dual function H.

The invention applies independently to the type of support network or type of service offered (TV live, PVR, VOD).

BACKGROUND ART

Content protected by an access control system CAS (for Conditional Access System) can be provided to a user according to different types of services, such as live broadcasting (TV Live), distribution on request (VoD, for Video on Demand) or replaying recorded content (PVR, for Personal Video Recorder, or NPVR, for Network Personal Video Recorder).

In all cases, the content provided to the user is initially scrambled by control words CWi and the operator controls the access to content by conditioning the obtaining of the control words to the holding by the user of a "commercial' authorisation. To that effect, the operator attaches an access condition to the content which must be satisfied by the subscriber or by his equipment in order to be able to descramble this content.

Transmitting control words and the description of the access condition are carried out by specific access control messages, called ECM messages (Entitlement Control Message). Control words CWi are encrypted by a service key before being transmitted in the ECM messages. As is appreciated by those skilled in the art, the access condition includes one or more criteria programme cost, moral level threshold, etc.) which must be satisfied by the access rights (subscription, ticket, etc.) stored in the security processor or through agreements given by the user (agreement for Pay Per View, moral agreement, etc.). Transmitting the service key and access right is carried out by specific access control messages, called EMM messages (Entitlement Management Message).

At the level of the equipment of the user, the ECM messages are processed by the security processor in order to, in particular, check its security parameters and compare the access condition to the access rights that were recorded beforehand in a non-volatile memory of the security processor. If the access condition is satisfied by the access rights, the security processor restores, via decryption, each control word that it provides to the reception terminal, thus allowing for descrambling.

The security processor thus exchanges data with the reception terminal: in particular, it receives and processes EMM and ECM messages, and provides the control words allowing the content to be descrambled. In a well-known example, the security processor is a chip card and these exchanges of data between reception terminal and security processor are carried out via an interface that is compliant with the ISO 7816 standard.

This architectural principle, in which the invention is placed, also applies when the security processor is built into the reception terminal, or when it interfaces with, or is built into, an access control and descrambling module that is external to the reception terminal, such as a module that is compliant with the EN 50221 standard ("Common Interface Specification for Conditional Access").

User equipment implementing access control according to this architecture principle can be subject to fraudulent use. One particular fraudulent use consists of exploiting the conditional access resources of the user equipment beyond its "normal" use by the user, either by unauthorised sharing of the use of the security processor (or "card sharing"), or by fraudulently redistributing the control words provided by the security processor (or "CW sharing").

The shared use of the security processor of a user equipment, consists in soliciting the latter by several reception terminals via a bidirectional communications network. This use results in particular in the submission to the security processor of messages that are syntactically correct but in a number or diversity that is excessive in relation to what they usually are based on "normal" use of the system.

Redistributing control words consists in having several reception terminals benefit from the control words CWi obtained by one of them, via a communications network. This form of piracy is applicable especially when the control words CWi transit in clear between the security processor and the reception terminal. Tapping the interface of the security processor and of the reception terminal thus allows the control words to be intercepted and fraudulently redistributed to other reception terminals ("MacCormac Hack"), redistribution which can be carried out using a server which broadcasts the control words CWi or providing them as a response to the submission of ECM messages associated with the contents under consideration.

FIG. 1 schematically shows such a situation of fraudulent redistribution of control words.

In reference to FIG. 1, equipment 2 of a user includes a reception terminal 4 associated with a security processor 6 such as a chip card. Reception terminal 4 receives ECM from the headend and transmits (arrow 5) these ECM to security processor 6. Security processor 6 processes the ECM received in order to check the access conditions and decrypts the control words contained in these ECM, then transmits (arrow 8) the decrypted control words to reception terminal 4. These control words are likely to be intercepted fraudulently on the security processor/reception terminal interface then distributed fraudulently (arrows 12) by a pirate server 10 to reception terminals 14.

Solutions are known to fight against fraudulent uses of the "card sharing" or "OW sharing" type. For example, matching may be activated between security processor and reception terminal as described in French patents FR 2 866 772 and FR 2 866 773; control words may be sent in encrypted format by the security processor to the reception terminal as disclosed in patent application FR 2 882 208; the security processor can provide the reception terminal with, not the control words, but data allowing the terminal to reconstitute them as disclosed in patent application FR 2 876 858. However, these various solutions require, in addition to adapting the security processor, an adaptation of the reception terminals. If it is relatively easy to change a chip card, it is more restricting and more costly to change an existing stock of reception terminals in order to support these new features.

The purpose of the invention is to allow for the "tracking" of user equipment, typically their security processors, that are contributing to a system of sharing cards or redistributing control words, and therefore to allow the operator involved to identify, via means outside the system, the customer who holds such a user equipment that contributes to this piracy. Implementing this invention involves only adapting the security processor, without having to modify the existing reception terminals.

The proposed solution applies mainly in the case where the control words transit in a non-encrypted format over the interface between security processor and reception terminal. It can also be implemented when this interface is protected by encryption but remain latent in order to be reactivated in the case where this interface protection would be compromised.

DISCLOSURE OF THE INVENTION

The invention calls for a method of transmitting at least one additional piece of data D in a list of access control words $CW_i$ to a scrambled content transmitted by a content server of an operator to a user equipment including a reception terminal associated with a security processor, each control word $CW_i$ of said list being designed to descramble said contents during a determined cryptoperiod.

The method according to the invention includes the following steps:

a) prior replacement of at least one of the control words of said list with a magnitude X resulting from the treatment of said additional piece of data D by a function G having a dual function H, and at the reception of said list by the terminal, b) retrieve said additional piece of data D by treating said magnitude X with dual function H.

According to a characteristic of the invention, magnitude X presents a format that is identical to that of the replaced control word.

Preferably, the dual function H restores moreover the control word replaced during step a).

In a first alternative in implementing the method according to the invention, the list of control words $CW_i$ includes a first control word $CW_c$ designed to decrypt the contents during the present cryptoperiod, and a second control word $CW_s$ designed to decrypt the contents during the following cryptoperiod, and in that said magnitude X replaces the second control word $CW_s$.

In a particular application of the method according to the invention, additional piece of data D represents an identifier of a user or a unique identifier UA of the security processor.

In another application of the method according to the invention, said additional piece of data D is a 30 command destined to the reception terminal.

When the method is applied to a given content, function G and the replacing of the control word are executed in the content server of the operator.

In another alternative, function G and the replacing of the control word are executed in the security processor associated with the reception terminal.

In this latter case, the execution of function G and the replacing of the control word is driven by the operator and includes an arming step and an activation step, with the arming step consisting in defining, for the given contents and for a selected security processor, an arming period during which the function G and the replacing of the control word are executable, and the activation step consisting in commanding the execution, via said selected security processor, of function G and the replacing of a particular control word with the magnitude X in accordance with the conditions defined in the arming step.

Preferably, the arming period and the designation of the contents for which said function G and the replacing of the control word can be executed are transmitted in a hidden format in an EMM message to the selected security processors, and the execution of function G and the replacing of the particular control word with the magnitude X are triggered by the operator using a specific command transmitted in hidden format in an EMM message or in an ECM message.

In a second alternative, the execution of function G and the replacing of the particular control word with the magnitude X are triggered autonomously by the security processor.

In a third alternative, the execution of function G and the replacing of the particular control word with 5 the magnitude X are triggered randomly.

In a particular embodiment of the invention, the designation of the particular control word to be replaced with the magnitude X is carried out by an ECM generator (ECM-G) associated with the content server. This designation of the control word and the identification of the present content are transmitted in hidden format to the security processors in ECM messages associated with said content.

The security processors implementing the method according to the invention include a module making it possible to replace in the list of control words $CW_i$ at least one of the control words with a magnitude X resulting from the treatment by a function G of an additional piece of data D to be transmitted to the reception terminal, said additional piece of data D being retrieved by said reception terminal using a dual function H of the function G.

The content server designed to transmit a scrambled content to a user equipment includes a module making it possible to replace in said list of control words $CW_i$ at least one of the control words with a magnitude X resulting from the treatment of an additional piece of data D to be transmitted to reception terminal by a function G, said additional piece of data D being retrieved by said reception terminal using a dual function H of function G.

The reception terminal, designed to receive the scrambled content transmitted by said server and accompanied by a list of control words wherein at least one of the control words has been replaced with a magnitude X resulting from the treatment of an additional piece of data D by a function G having a dual function H, includes a module making it possible to retrieve, via application of function H to the data X, the control word replaced and/or the data D.

In an embodiment of the invention, this module of the terminal is a software module.

In another embodiment of the invention, this terminal comprises an observer module including means to send said additional piece of data back to the operator.

BRIEF DESCRIPTION OF THE DRAWINGS

Other characteristics and advantages of the invention will become evident from the description that shall follow, by way of non-exclusive example, in reference to the annexed figures wherein.

DETAILED DISCLOSURE OF PARTICULAR EMBODIMENTS

The invention shall be described in a context of distribution of scrambled audiovisual programmes.

This distribution can be:
- within the framework with a live broadcast service wherein the contents are broadcast in real time to a large number of users, using a broadcast network (satellite, cable, terrestrial, IP in broadcast/multicast mode, etc.).
- within the framework of a VOD service (for Video On Demand) wherein, on request, content is sent to a particular user via a broadcast network that allows the user to be addressed individually (typically the IP network in unicast mode).
- within the framework of a PVR service (for Personal Video Recorder) wherein content (broadcast or as VOD) is recorded by the user on his terminal equipment or by a similar function offered by the network operator, with the user being able to access the recorded content at a later time.

Regardless of the service provided, the method according to the invention includes a configuration step consisting in designating the content (or service) involved and the control word that must be modified by the security processor.

In the rest of this description, we shall designate by the expression "watermarking of a control word" the replacement of this control word by a piece of data via the application of the method according to the invention.

Identical references shall designate the elements that are common to the various figures.

Figure 1:
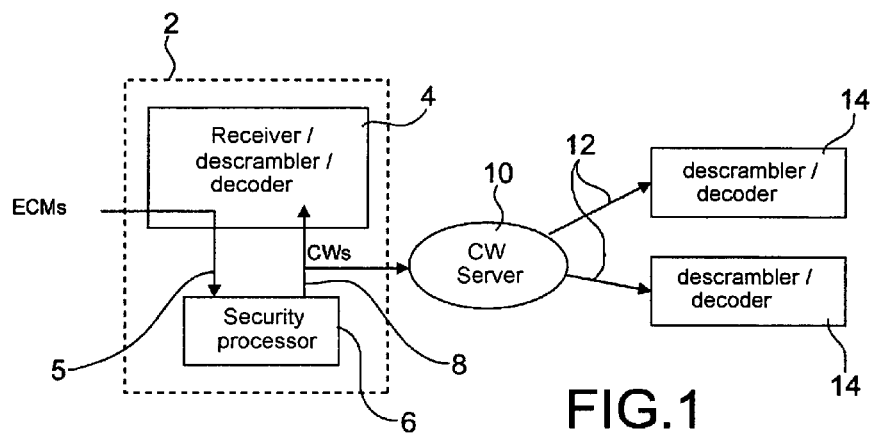
FIG. 1, previously described, schematically shows a device for the fraudulent redistribution of access control words to a scrambled content.
Figure 2:
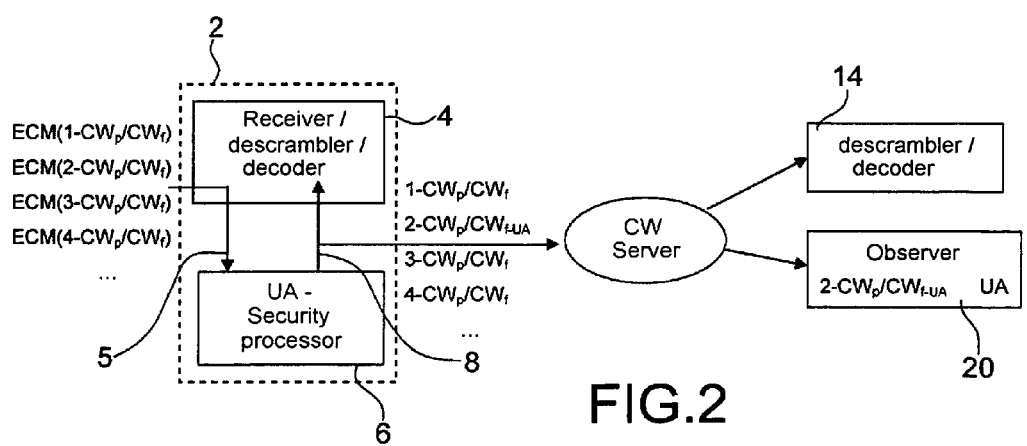
FIG. 2 schematically shows the implementation of the method according to the invention in the context of the device in FIG. 1.

FIG. 2 schematically shows the implementation of the method in the architecture described in FIG. 1.

In the example shown in FIG. 2, a reception terminal 4 of a user receives four successive ECM from the headend ECM (1-$CW_p$/$CW_f$), ECM (2-$CW_p$/$CW_f$), ECM (3-$CW_p$/$CW_f$) and ECM (4-$CW_p$/$CW_f$) each containing a pair of control words $CW_p$, $CW_f$ representing respectively the present control word $OW_p$ (p for "present") and the following control word $CW_f$ (f for "following"). It is understood that the following control word $CW_f$ in an ECM, for example ECM (2-$CW_p$/$CW_f$) is the present control word $OW_p$ in the following ECM, in this example ECM (3-$CW_p$/$CW_f$)

This architecture includes moreover an observer terminal 20 programmed to exchange information with the headend via a secure channel.

Reception terminal 4 receives with the content ECM messages and transmits them to security processor 6 (arrow 5). With each ECM received security processor 6 checks the access conditions, decrypts the control words contained in these ECM then sends (arrow 8) the decrypted control words to reception terminal 4. In the particular case of ECM (2-$CW_p$/$CW_f$), control word $CW_f$ which should be sent back to the reception terminal is replaced with piece of data $CW_{f\_UA}$ (equal to G (UA)), or watermarked control word, calculated according to the unique identifier UA of security processor 6.

The capture and the analysis, by observer terminal of the piece of data $CW_{f\_UA}$ transmitted fraudulently by pirate server 10 to the pirate terminals 14 makes it possible to determine the UA of the security processor that is supplying the watermarked control word, and therefore the contributor to pirating.

Note that the observer terminal is controlled by the operator and is configured to distinguish a control word value from a value resulting from watermarking, i.e. from a result X of function G. This distinction is made for example by comparing the values received from the pirate device with the control words actually used by the operator. This comparison is improved by performing it in correlation with the activation instants of the method that the operator defines himself.

The observer terminal then applies dual function H to the data received in order to extract the identifier of the security processor UA (equal to H($CW_{f\_UA}$)) via application of function H.

Observer terminal 20 then sends said UA of said security processor to the headend via the secure channel.

The operator can then apply a countermeasure to counter the pirate device identified in this way.

Note that the watermarked control word replacing control word $CW_f$ can be calculated according to an identifier that belongs to the user of user equipment 2 without leaving the scope of the invention.

In current standards concerning the implementation of scrambling, transporting and descrambling in a context such as DVB, control words CW are not designated as "present" and "following" but as "even" and "odd" in reference to the "even" and "odd" phases of scrambling. When the scrambling is in the "even" phase, the "even" control word is the "present" control word and the "odd" control word is the "following" control word. This is reversed when the scrambling is in "odd" phase. So, in order to allow security processor 6 to locate the "following" control word over time from among the control words transported in the ECMs, a scrambling parity attribute is associated with the scrambled content at each cryptoperiod. This attribute makes it possible to determine which of the "even" or "odd" control words is used to scramble the contents during the present cryptoperiod. Note that an indication of scrambling parity already exists in scrambled content (video, sound) but it is not useable in real time by a conditional access system in a user equipment, that is why such a parity attribute is specifically introduced into the ECM messages. This attribute is determined when the content and associated ECM messages are sent.

Figure 3:
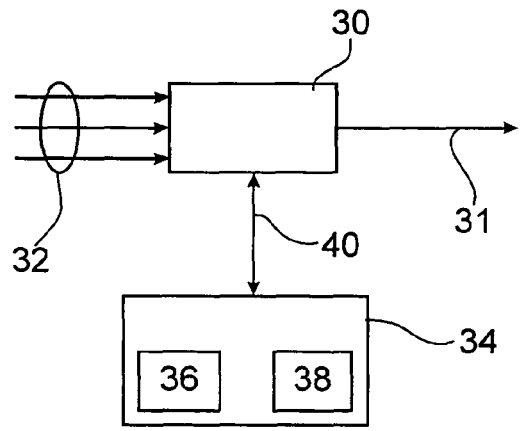
FIGS. 3 and 4 show an example of determination by the equipment of the operator of the control word to watermark.
Figure 4:
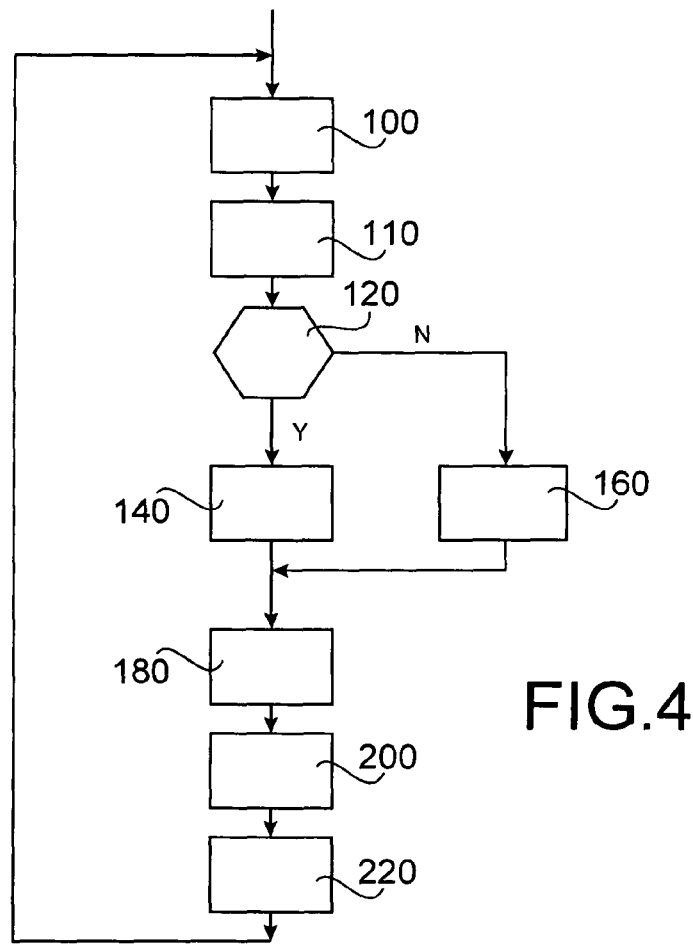

FIGS. 3 and 4 show an example of determination by the operator equipment of the control word to watermark.

In reference to FIG. 3, the equipment of the operator includes in particular a multiplexer/scrambler in charge of combining in a multiplex 31, for example compliant with the ISO 13818 "MPEG2" standard, streams 32 of digital video, audio or various data comprising content, and to scramble them. An ECMG generator 34 provides multiplexer 30 with ECM messages to associate with the content in the multiplex 31.

ECMG generator 34 includes moreover memory 36 containing a variable CWeven to which it assigns the last value of the control word received from multiplexer 30 that it has identified as an even control word and second memory 38 wherein it stores the parity of the control word that it has determined as being the control word to watermark. By default, the variable $CW_{even}$ is insignificant.

Among other possible embodiments, a dialog protocol 40 between multiplexer 30 and the ECMG generator 34 is compliant with the TS 103 197 "DVB Simulcrypt" standard. The implementation of this protocol is described here in the case of ECM messages transporting two control words. The establishment according to this protocol of an exchange channel between multiplexer 30 and ECMG generator 34 is known in the art and is assumed to have been carried out.

FIG. 4 is an example of a timing chart executed by multiplexer 30 and ECMG generator 34 at each cryptoperiod in order to determine the control word to watermark.

During a step 100, multiplexer 30 sends to ECMG generator 34 an ECM message request of which the parameters are in particular the two even $CW_{2k}$ and odd $CW_{2k+1}$ control words to be inserted into the requested ECM. One of these control words is the present control word used by the present scrambling, and the other is the following control word. Indeed, the "DVB Simulcrypt" protocol identifies the parity of the control words sent by the multiplexer to ECMG generator 34, but does not stipulate which one of these control words is the one used by the present scrambling.

During a step 110, ECMG generator 34 extracts the two control words and the other parameters from the request that it received. These other parameters are typically used by ECMG generator 34 to construct the access condition to be inserted into the ECM; however, they do not participate in the process described here.

During a step 120, ECMG generator 34 compares the value of the even control word received $CW2k$ with the value of its variable $CW_{even}$. If these two values are identical, it concludes that this control word $CW2k$, unchanged since the last cryptoperiod, is the present control word used by scrambler 30. In this case, during a step 140, ECMG generator 34 stores in the second memory 38 that the parity of the control word to watermark is odd. If the two values compared in 120 are not identical, ECMG generator 34 stores, during a step 160, in second memory 38 that the parity of the control word to watermark is even.

Then, during a step 180, ECMG generator 34 stores the value of the even control word $CW2k$ received in first memory 36.

Finally, ECMG generator 34 constructs during a step 200 the ECM message requested by the multiplexer in step 110. In order to generate this ECM message, ECMG generator 34 encrypts the two control words $CW_{2k}$ and $CW_{2k+1}$ received and combines them in particular at the chosen access condition. When the watermarking function is activated, as shall be described further on, ECMG generator 34 also inserts into the ECM message the value contained in the second memory designating the control word to watermark. This message, once constituted, is sent to multiplexer 30 during a step 220 in order to be inserted in digital multiplex 32.

Steps 100 to 220 are repeated at each cryptoperiod.

Checking Watermarking of the Control Word by the Operator

The watermarking function is controlled by the operator in two phases: an arming phase during which a security processor can apply the watermarking to a control word, and an activation phase during which, under the reserve of arming, a security processor must apply the watermarking to a control word. According to the implementation, one and/or the other of these phases are implicit, or explicitly commanded by the operator.

In a preferred embodiment, the operator explicitly controls the parameters of these two phases. The method according to the invention applies, for a given security processor, to a given service (programme, or channel) or to all of the services provided by the operator.

During the arming phase, the operator defines for a given security processor:
  The period for which the watermarking function is armed. Outside of this period, no watermarking is carried out, and during this period, watermarking can take place by said security processor. This period is therefore an application window for watermarking control words.
  The identifier of a service for which the watermarking is to be carried out. The operator then selects the service that he is planning to observe in order to identify a pirate. Preferably, the operator can designate a particular service or all of the services.

The arming of the watermarking of control words is carried out by the operator by transmitting a confidential EMM to the security processor of a user.

Such a confidential EMM contains a specific parameter, called the watermarking arming of control words PDTCW, which includes:
  the date of watermarking arming of control words DDTCW;
  The duration of the watermarking arming period of control words PPCW, preferably equal to the duration of the cryptoperiod used by the multiplexer.
  An identifier SERVICE_ID of the service for which watermarking to be armed, of which a particular value allows to arm watermarking of control words for all of the services of the operator.

The arming parameter for watermarking control words is transmitted to security processor 6 with a broadcast date so as to prevent a replay of the corresponding EMM message.

Security processor 6 is programmed in such a way as to process this parameter only if it is dated and if its broadcast date is greater than that of the last parameter of the same type that has already been processed.

By using the addressing capabilities of EMM messages, the operator can arm the watermarking function in a particular security processor, in a group of security processors or in all of the security processors.

Analogously, the watermarking function of control words can be disarmed by EMM message, for example if the operator wants to suspend this function on a subset of the stock, although the arming message was initially addressed to all the reception terminals in the stock.

Security processor 6 is also programmed to use this disarming function after having sent a watermarked control word. This allows security processor 6 to apply the watermarking procedure of control word CW only once starting from the starting date of watermarking control words.

Alternatively, the arming parameter PDTCW is transmitted to security processors 6 in confidential format in an ECM.

The activation phase is that during which a security processor applies watermarking to a particular control word. Watermarking activation is carried out by a specific parameter CWTAT introduced in an ECM by the ECM generator 32.

This CWTAT parameter characterises the conditions for applying watermarking of control words. It includes:
  an identifier ECM_SERVICE_ID of the service to which the ECM is referring,
  a parameter PARITY designating which of the two control words present in the ECM must be watermarked. This parameter takes the value of indicator 38. Preferably, other than the values of "even" and "odd", this parameter can take the value "no watermarking" in order to inhibit activation.

This parameter CWTAT is moreover associated with a date of the ECM message. This date is explicit in the ECM message or, preferably, established by the security processor at the instant the ECM message arrives. Several technical solutions are known in the art in order for a security processor to be able to manage time and know the arrival date of an ECM.

Preferably, the parameter CWTAT is transmitted in an ECM message in a confidential manner.

It is understood that all of the security processors targeted during the arming phase are likely to activate the method when the ECM message is received.

Alternatively, the activation phase can be triggered on a portion of the security processors wherein the watermarking method has been armed. The activation then implements an ECM message and an EMM message. The ECM message transports the parameter CWTAT which prepares the security processor to apply the method but does not trigger it. The EMM message transports a specific command so that the security processor(s) targeted by this EMM message actually trigger the watermarking method.

Processing the Watermarking of the Control Word by the Security Processor

During the arming phase, security processor 6 receives parameter PDTCW for arming watermarking of control words via EMM for an operator. When this EMM message is processed, the security processor verifies that this message has not already been processed and, if this is the case, stores the watermarking arming parameters extracted from the parameter PDTCW:

Date starting on which activation of control word watermarking is possible;
Duration of the period during which control word watermarking is possible;
Identifier of the service for which control words can be watermarked.

When an ECM message is received from an operator containing the parameter CWTAT for watermarking activation, security processor 6 carries out watermarking only if the following conditions are all present:

control word watermarking is armed, i.e. the security processor has the data (arming period and service) of a PDTCW parameter for this operator,
the parameter PARITY identifying in the ECM the control word to be watermarked is not equal to "no watermarking",
the parameter ECM_SERVICE_ID of the ECM corresponds to the identifier of the service SERVICE_ID provided by the arming EMM,
the date of the ECM falls within the application window of the measure determined by the arming period (between DDTCW and DDTCW+PPCW).

If the parameter PARITY is equal to "even", the even CW is watermarked.

If the parameter PARITY is equal to "odd", the odd CW is watermarked.

At the end of this procedure, preferably, the security processor proceeds with disarming the watermarking function in order to avoid repeating watermarking of control word CW.

The watermarking method for the purposes of identifying an illicit device is all the more so effective in that its activation cannot be predicted by the targeted device. Thus, other than the confidentiality of the parameters involved in the ECM message, it is preferred that the activation of the method be triggered by the operator randomly. Moreover, beyond the activation via the reception of the ECM message, actual execution of watermarking may be delayed by a random timer by the security processor.

Transmission of a Command to a Reception Terminal

While still remaining within the scope of the invention, the method described above can be used to transmit a command to a reception terminal. Piece of data D represents this command and has a particular meaning that can be understood by the reception means to render the sending of a command to a reception terminal confidential.

Such a command to the terminal represented by data D can be:

generated and triggered by the security processor itself: for example when the security processor knows how to detect abnormal operation of the reception terminal suggesting an illicit terminal, it triggers itself the sending to the terminal of terminal invalidation command transmitted as data D according to the invention.

generated by the security processor as triggered by the operator: for example when a user equipment has been identified via watermarking by UA of the control words described previously, the method is armed again for this equipment then the security processor itself triggers the sending of a terminal invalidation command to the terminal through the intermediary of data D; this operating mode is stipulated to the security processor during the arming phase or the activation phase by an additional dedicated parameter.

generated and triggered by the operator: in this example, the command expressed by data D is issued by the operator, watermarking is then carried out as soon as the ECM are generated. In this case the security processor does not carry out any additional watermarking on the control words that it provides to the reception terminal. Such a command is typically of general use such as the activation or deactivation of some audio-visual output from the reception terminal. Preferably watermarking functions G and H are chosen in such a way that the reception terminal can look up the value of the watermarked control word and that of command D.

The invention claimed is:

1. Method of transmitting at least one additional piece of data D in a list of access control words $CW_i$ to a scrambled content transmitted by a content server of an operator to a user equipment (2) including a reception terminal (4) associated with a security processor (6), each control word $CW_i$ of said list being designed to descramble said contents during a determined cryptoperiod, comprising the following steps:

a) prior replacement of at least one of the control words of said list with a resulting value X resulting from the treatment of the additional piece of data D by a function G having a dual function H with said function G and said replacement of the control word being executed in the security processor (6) associated with reception terminal (4), wherein said list includes a first control word $CW_c$ designed to decrypt the contents during the present cryptoperiod, and a second control word $CW_s$ designed to decrypt the contents during the following cryptoperiod, and said resulting value X replaces the second control word $CW_s$ and wherein said resulting value X presents a format that is identical to that of the replaced control word and, at the reception of said list by the reception terminal (4), b) retrieving said additional piece of data D by treatment of said magnitude X by dual function H;

c) capturing the retrieved additional piece of data D using an observer terminal (20) programmed to exchange information with the reception terminal for receiving entitlement control message(s) (ECM) and/or entitlement management message(s) (EMM) via a secure channel, and d) analyzing the retrieved additional piece of data D to determine a security processor that is contributing to pirating;

wherein said additional piece of data D is a unique identifier UA of the security processor (6) or an identifier of the user.

2. Method according to claim 1, characterized in that dual function H returns moreover the control word replaced during step a).

3. Method according to claim 1, characterized in that said additional piece of data D comprises a command destined for the reception terminal (4).

4. Method according to claim 1, wherein the execution in security processor (6) of function G and the replacing of the control word is driven by the operator and includes an arming step and an activation step, said arming step consisting in defining, for a given content and for a selected security processor (6), an arming period during which function G and the replacing of the control word can be executed, said activation step consisting in triggering the execution, by said selected security processor (6), of function G and the replacing of a particular control word with the resulting value X in accordance with the conditions defined in the arming step.

5. Method according to claim 4, characterized in that the arming period and the designation of the content for which said function G and said replacing of control word can be executed are transmitted in hidden format in an EMM message to the selected security processors (6), and in that the execution of function G and the replacing of the particular control word with the resulting value X are triggered by the operator using a specific command transmitted in hidden format in an EMM message or in an ECM message.

6. Method according to claim 4 wherein the designation of the particular control word to be replaced with resulting value X is carried out by an ECM generator (30) associated with the content server.

7. Method according to claim 4, characterized in that the designation of the control word to be replaced by resulting value X and the identification of the present content are transmitted in hidden format to the security processors (6) in ECM messages associated with said content.

8. Method according to claim 1, characterized in that the execution of function G and the replacing of the particular control word with the resulting value X is triggered autonomously by the security processor (6).

9. Method according to claim 1, characterized in that the execution of function G and the replacing of the particular control word with the resulting value X is triggered randomly.

10. Security processor (6) associated with a reception terminal (4) in a user equipment (2) designed to receive a scrambled content transmitted by a content server of an operator with a list of control words $CW_i$ each designed to descramble said contents during a determined cryptoperiod, security processor (6) comprising a module for replacing at least one of the control words in said list with a resulting value X resulting from the treatment of an additional piece of data D from the list of access control words by the function G, wherein said list includes a first control word $CW_c$ designed to decrypt the contents during the present cryptoperiod, and a second control word $CW_s$ designed to decrypt the contents during the following cryptoperiod, and said resulting value X replaces the second control word $CW_s$, and wherein said resulting value X presents a format that is identical to that of the replaced control word, wherein said additional piece of data D is retrieved by said reception terminal (4) using a dual function H of function G, and further comprising an observer terminal (20) programmed to exchange information with the reception terminal in said user equipment via a secure channel with said observer terminal (20) capturing the retrieved additional piece of data D and analyzing the retrieved additional piece of data D to determine a security processor that is contributing to pirating, wherein said additional piece of data D is either a unique identifier UA of said security processor (6), or an identifier of the user or a command destined for the reception terminal.

11. Security processor (6) according to claim 10, characterized in that said additional piece of data D is a unique identifier UA of said security processor (6).

12. Security processor (6) according to claim 10, characterized in that said additional piece of data D is a command destined to reception terminal (4).

13. Content server designed to transmit, to a user equipment (2) including a reception terminal (4) associated with a security processor (6), a scrambled content to which is associated a list of control words $CW_i$ each designed to descramble said contents during a determined cryptoperiod, and content server comprises a module for replacing at least one of the control words in said list with a resulting value X resulting from the treatment of an additional piece of data D from the list of access control words by a function G, wherein said list includes a first control word $CW_c$ designed to decrypt the contents during the present cryptoperiod, and a second control word $CW_s$ designed to decrypt the contents during the following cryptoperiod, and said resulting value X replaces the second control word $CW_s$, and wherein said resulting value X presents a format that is identical to that of the replaced control word, said additional piece of data D being retrieved by said reception terminal (4) using a dual function H of function G, and further comprising an observer terminal (20) programmed to exchange information with the reception terminal in said user equipment via a secure channel, for capturing the retrieved additional piece of data D and for analyzing the retrieved additional piece of data D to determine a security processor that is contributing to pirating, wherein said additional piece of data D is either a unique identifier UA of said security processor (6), or an identifier of the user or a command destined for the reception terminal.

* * * * *